(12) United States Patent
Jou

(10) Patent No.: US 7,804,900 B2
(45) Date of Patent: Sep. 28, 2010

(54) METHOD FOR FAST SATD ESTIMATION

(75) Inventor: Fan-Di Jou, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 1254 days.

(21) Appl. No.: 11/360,552

(22) Filed: Feb. 23, 2006

(65) Prior Publication Data

US 2007/0198622 A1   Aug. 23, 2007

(51) Int. Cl.
*H04B 1/66* (2006.01)
(52) U.S. Cl. .............................. 375/240.18; 375/240.24
(58) Field of Classification Search ............ 375/240.18, 375/240.24
See application file for complete search history.

(56) References Cited

U.S. PATENT DOCUMENTS

2005/0257026 A1\* 11/2005 Meeker ........................ 712/22
2006/0215758 A1\* 9/2006 Kawashima ............ 375/240.16
2008/0008242 A1\* 1/2008 Lu et al. ................. 375/240.16

OTHER PUBLICATIONS

Jou, F., et al., "Fast SATD MEthod for H.264/AVC Video Coding", *CCL Technical Journal*, (Sep. 2005).

\* cited by examiner

*Primary Examiner*—Don N Vo
(74) *Attorney, Agent, or Firm*—Alston & Bird LLP

(57) ABSTRACT

A method for determining an encoding cost for a block of video data includes providing an image frame, partitioning the image frame into multiple blocks, obtaining a difference matrix for one of the multiple blocks, performing a part of an FHT (Fast Hadamard Transform) for the difference matrix including at least one butterfly step to obtain outputs in a sequence, the at least one butterfly step in number being one butterfly step less than that required for performing the entire FHT, performing an absolute value operation for each of the outputs, comparing the absolute values of every two of the outputs according to the sequence to determine a greater value for each of the every two absolute values, and adding the greater value of each of the every two absolute values thereby obtaining the encoding cost as a sum of absolute transformed differences (SATD) of the difference matrix.

25 Claims, 15 Drawing Sheets

$SATD(D) = 2 \cdot SAD(H_n DH_m)$

METHOD FOR FAST SATD ESTIMATION

BACKGROUND OF THE INVENTION

The present invention generally relates to image processing and, more particularly, to a method and device for fast SATD (Sum of Absolute Transformed Differences) estimation.

In recent years, it has become increasingly popular to transmit multimedia data, in particular, dynamic digital video data, via the Internet. Compression of digital video data is required for the transmission of multimedia data over bandwidth-constrained channels. To achieve efficient compression, complex, computationally intensive processes are used for encoding (i.e., compressing) and decoding (i.e., decompressing) the digital video data. For example, although MPEG-2 (Moving Pictures Expert Group, International Organization for Standards, Geneva, Switzerland) is known as an efficient technique for encoding video data, more efficient standards are being developed, such as the H.264/AVC ("Advanced Video Coding") standard proposed by International Telecommunication Union Telecommunication Standardization Sector, Geneva, Switzerland.

The prediction mode of the H.264/AVC may be categorized into an inter mode and an intra mode. The inter mode is used to describe the temporal correlation between blocks within an image frame and a reference frame, while the intra mode is used to describe the spatial correlation between neighboring blocks within a same image frame. In the inter mode, a block of an image frame may be further divided into multiple blocks in accordance with seven partition modes, i.e., the inter 16×16, inter 16×8, inter 8×16, inter 8×8, inter 8×4, inter 4×8 and inter 4×4 modes. On the other hand, in the intra mode, the intra 16×16 and intra 4×4 modes are used as the partition modes. An encoder conducts a best-mode search to determine the encoding cost of each of the partition modes under the inter mode and the intra mode, respectively. The encoder then compares the inter mode that has the lowest encoding cost and the intra mode that has the lowest encoding cost to determine the final best mode. The above-mentioned process is typically called mode decision, which is the most computationally intensive task for an H. 264/AVC encoder.

In the H.264/AVC reference software, SATD (Sum of Absolute Transformed Differences) is used to determine the encoding cost. The SATD is usually the most important term and the largest computational load for making a mode decision. As compared to the conventional SAD (Sum of Absolute Differences), SATD is more precise in estimating the cost and provides better encoding quality. However, SATD may require larger computation capacity and a larger hardware budget due to its computation complexity.

The existing methods for fast SATD operation are generally directed to a Hadamard transform. Specifically, most of the existing methods are based on the FHT (Fast Hadamard Transform) algorithm, which is an FFT-like (Fast Fourier Transform) method. Other methods may be related to reducing the number of video samples taken or performing only a part of transform, which decreases the operation time at the sacrifice of SATD precision. It is therefore desirable to have a system and method to reduce the computation complexity and increase the speed in SATD operation without compromising the SATD performance.

BRIEF SUMMARY OF THE INVENTION

In accordance with an embodiment of the present invention, there is provided a method for determining an encoding cost for a block of video data that comprises providing an image frame, partitioning the image frame into multiple blocks, obtaining a difference matrix for one of the multiple blocks, performing a part of an FHT (Fast Hadamard Transform) for the difference matrix including at least one butterfly step to obtain outputs in a sequence, the at least one butterfly step in number being one butterfly step less than that required for performing the entire FHT, performing an absolute value operation for each of the outputs, comparing the absolute values of every two of the outputs according to the sequence to determine a greater value for each of the every two absolute values, and adding the greater value of each of the every two absolute values thereby obtaining the encoding cost as a sum of absolute transformed differences (SATD) of the difference matrix.

Also in accordance with the present invention, there is provided a method for determining an encoding cost for a block of video data that comprises providing an image frame, partitioning the image frame into multiple blocks including one having a size of N×M, N and M being integers, obtaining a difference matrix of N×M for the one block, performing a part of an FHT (Fast Hadamard Transform) for the difference matrix including a number of $[(\log_2 NM)-1]$ butterfly steps to obtain outputs in a sequence, performing an absolute value operation for each of the outputs, comparing the absolute values of every two of the outputs according to the sequence to determine a greater value for each of the every two absolute values, and adding the greater value of each of the every two absolute values thereby obtaining the encoding cost as a sum of absolute transformed differences (SATD) of the difference matrix.

Further in accordance with the present invention, there is provided a method for determining an encoding cost for a block of video data that comprises providing an image frame, partitioning the image frame into multiple blocks, obtaining a difference matrix for one of the multiple blocks, performing a part of an FHT (Fast Hadamard Transform) for the difference matrix including at least one butterfly step to obtain outputs in a sequence, the at least one butterfly step in number being one butterfly step less than that required for performing the entire FHT, performing a summing operation for every two of the outputs according to the sequence to obtain a sum, performing a first comparison operation for every two of the outputs according to the sequence, and performing a second comparison operation for the sum and zero thereby obtaining the encoding cost as a sum of absolute transformed differences (SATD) of the difference matrix.

Still in accordance with the present invention, there is provided a method for determining an encoding cost for a block of video data that comprises providing an image frame, partitioning the image frame into multiple blocks, obtaining a difference matrix for one of the multiple blocks, performing a part of an FHT (Fast Hadamard Transform) for the difference matrix including at least one butterfly step to obtain outputs in a sequence, the at least one butterfly step in number being one butterfly step less than that required for performing the entire FHT, and performing comparison operations for values corresponding to every two of the outputs according to the sequence thereby obtaining the encoding cost as a sum of absolute transformed differences (SATD) of the difference matrix.

Yet still in accordance with the present invention, there is provided a device for determining an SATD (Sum of Absolute Transformed Differences) for a difference matrix that comprises a fast Hadamard transformer for performing a part of an FHT (Fast Hadamard Transform) for the difference matrix including at least one butterfly step to obtain outputs in a sequence, the at least one butterfly step in number being one butterfly step less than that required for performing the entire FHT, a processing unit for performing an absolute value operation for each of the outputs, a comparator unit for comparing the absolute values of every two of the outputs according to the sequence to determine a greater value for each of the every two absolute values, and a summing unit for adding the greater value of each of the every two absolute values.

BRIEF DESCRIPTION OF THE SEVERAL VIEWS OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings.

DETAILED DESCRIPTION OF THE INVENTION

The differences between a predict block provided in accordance with the prediction mode of the H.264/AVC and an actual block are called residual differences, generally in the form of a matrix, denoted as $D_{N \times M} = \{d_{i,j}\}$, where N×M is a block size, $N=2^n$, $M=2^m$, $0 \leq i < N$, $0 \leq j < M$, N and M being integers. The SATD (Sum of Absolute Transformed Differences) and SAD (Sum of Absolute Differences) are defined below as:

$$SAD_{N \times M}(D_{N \times M}) = \sum_{i=0}^{N-1} \sum_{j=0}^{M-1} |d_{i,j}| \qquad \text{Equation (1)}$$

$$SATD_{N \times M}(D_{N \times M}) = SAD_{N \times M}(T(D_{N \times M})) \qquad \text{Equation (2)}$$

where T is an orthogonal transform function for transforming an N×M matrix into another N×M matrix. An SATD operation includes transforming the residual differences of two blocks into a frequency domain, and computing the sum of the absolute differences thereafter.

In the H.264/AVC reference software, the orthogonal transform used in the SATD is the Hadamard transform. One of the advantages of the Hadamard transform is its simplicity in computation, which may be composed of two types of operators, i.e., addition and shifting. The Equation (2) can be rewritten as follows.

$$SATD_{N \times M}(D_{N \times M}) = \frac{2}{\sqrt{NM}} \cdot SAD_{N \times M}(H_n D_{N \times M} H_m) \qquad \text{Equation (3)}$$

where $H_n$ and $H_m$ are Hadamard matrixes of N×N and M×M, respectively, $1/\sqrt{N}$ and $1/\sqrt{M}$ are the orthogonal coefficients of the matrixes $H_n$ and $H_m$, respectively, and the constant 2 is a parameter to balance the SATD and SAD scales in the H.264/AVC reference software.

The Hadamard matrix used in the Equation (3) may be defined in the recursive form below.

$$H_1 = \begin{bmatrix} 1 & 1 \\ 1 & -1 \end{bmatrix} \qquad \text{Equation (4)}$$

$$H_{k+1} = \begin{bmatrix} H_k & H_k \\ H_k & -H_k \end{bmatrix}, \forall k \geq 1 \qquad \text{Equation (5)}$$

If matrix multiplication is directly used to implement the SATD, as an example of $SATD_{4 \times 4}$, a total number of 111 operations are required, of which 96 operations account for the $H_2 D_{4 \times 4} H_2$ part, and 15 operations account for the $SAD_{4 \times 4}$ part in the Equation (3). However, using a fast computation method similar to a Fast Fourier Transform algorithm, i.e., FHT (Fast Hadamard Transform) algorithm, the number of operations required in the Hadamard transform may be reduced. For example the FHT requires only 12 (=4×3) addition/subtraction operations to calculate a matrix multiplication below.

$$\begin{bmatrix} y_0 \\ y_1 \\ y_2 \\ y_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} x_0 \\ x_1 \\ x_2 \\ x_3 \end{bmatrix}$$

Figure 1A:
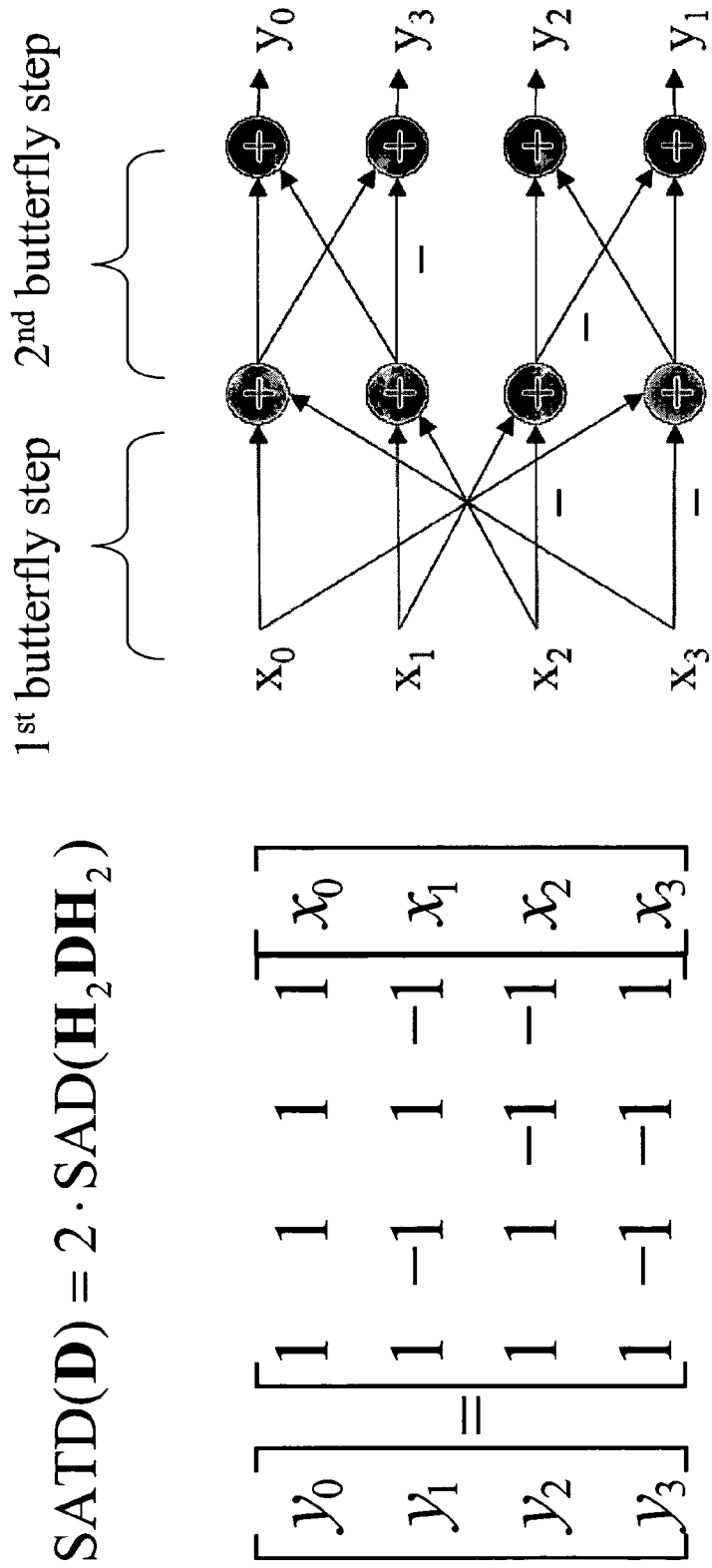
FIG. 1A illustrates a butterfly structure used in an FHT (Fast Hadamard Transform) application.

Further, if a butterfly structure is employed to compute the FHT, only 8 (=4×$\log_2$ 4) addition/subtraction operations are required. FIG. 1A illustrates a butterfly structure used in an FHT application. A butterfly structure including addition and subtraction operations in N-point transforms is called an N-point butterfly. Referring to FIG. 1A, the butterfly structure, which is a 4-point butterfly, includes a first butterfly step and a second butterfly step. Each of the first and second butterfly steps includes the crossing flow of data from input to output. However, the topology of data crossing in the first butterfly step is different from that in the second butterfly step, and therefore the butterfly structure does not include any recursion. For the $H_2D_{4\times4}H_2$ part in the Equation (3), the number of addition operations required is reduced to 64 (=16×$\log_2$ 16) if the butterfly structure illustrated in FIG. 1A is used.

Figure 1B:
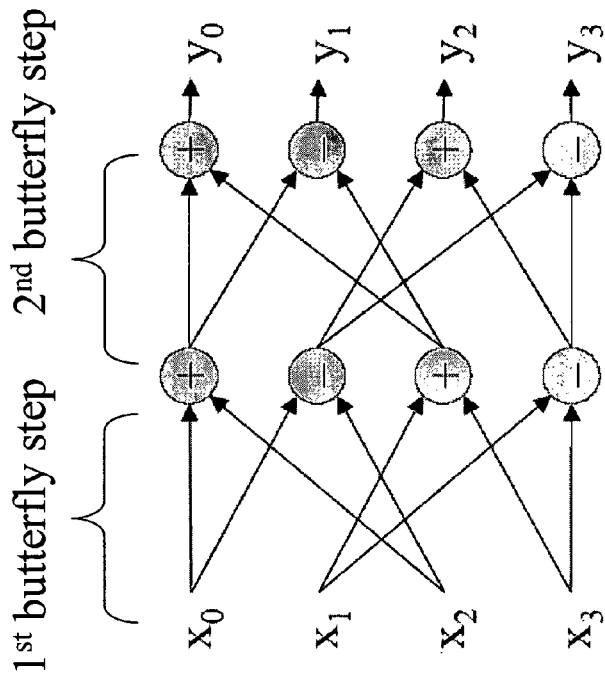
FIG. 1B illustrates another butterfly structure used in an FHT application.

The butterfly structure illustrated in FIG. 1A may be revised to another form. FIG. 1B illustrates another butterfly structure used in an FHT application. The butterfly structure, also a 4-point butterfly, includes a first butterfly step and a second butterfly step, having the same topology of data crossing as the first step. Such a butterfly structure includes recursion and is advantageous in hardware and software design, even though the number of addition/subtraction operations required is not further reduced as compared to the butterfly structure illustrated in FIG. 1A. Given an N×M block, in accordance with the butterfly structure illustrated in FIG. 1B, the $H_nD_{N\times M}H_m$ part in the Equation (3) is expressed in but is not limited to a recursive form as follows.

$$t^0_{i \cdot M+j} = d_{i,j} \qquad \text{Equation (6)}$$

$$\begin{cases} t^{k+1}_{2l} = t^k_l + t^k_{l+\frac{NM}{2}} \\ t^{k+1}_{2l+1} = t^k_l - t^k_{l+\frac{NM}{2}} \end{cases}, \forall k \geq 0 \qquad \text{Equation (7)}$$

where the Equation (6) defines an initial value and the Equation (7) defines the recursive body.

With the Equations (6) and (7), the Equation (3) can be rewritten as follows.

$$SATD_{N\times M}(D_{N\times M}) = \frac{2}{\sqrt{NM}} \sum_{l=0}^{NM-1} |t^{n+m}_l| \qquad \text{Equation (8)}$$

In view of the Equation (8), it is known that a total number of (n+m) recursion operations are required for k=0 to k=(n+m−1). Since a number of N×M addition operations are required for each of the recursion operations, the total number of addition operations required for the $H_nD_{N\times M}H_m$ part in the Equation (8) is NM×(n+m), i.e., NM×$\log_2$ (NM). As a comparison, the total number for the $H_nD_{N\times M}H_m$ part in the Equation (3) is NM×(N+M−2).

To reduce the number of operations required in the Equation (8), an equation as given below may be used.

$$|a+b|+|a-b|=2 \cdot \max(|a|,|b|) \qquad \text{Equation (9)}$$

That is, a maximum value operation, which refers to one for comparing two values to select a greater one, is used to reduce the number of addition operations. By substituting the Equation (9), the Equation (8) is rewritten as follows.

$$SATD_{N\times M}(D_{N\times M}) = \frac{4}{\sqrt{NM}} \sum_{l=0}^{\frac{NM}{2}-1} \max\left(|t^{n+m-1}_l|, \left|t^{n+m-1}_{l+\frac{NM}{2}}\right|\right) \qquad \text{Equation (10)}$$

In the Equation (10), the number of recursion operations is (n+m−1). Table 1 lists the number of operations required for each of the operators in the Equations (8) and (10), given $SATD_{4\times4}$.

TABLE 1

| operator/equation | add | max | abs | total |
|---|---|---|---|---|
| Equation (8) | 79 (=NM (n + m) + (NM − 1)) | 0 | 16 (=NM) | 95 (=NM (n + m + 2) − 1) |
| Equation (10) | 55 (=NM (n + m − 1) + NM/2 − 1) | 8 (=NM/2) | 16 (=NM) | 79 (=NM (n + m + 1) − 1) |

A total number of 16 operations are eliminated in the Equation (10) as compared to the Equation (8) because one recursion operation is eliminated. If it is assumed that the operation time required for each of the addition (add), maximum value (max) and absolute value (abs) operators is the same, given $SATD_{4\times4}$, such elimination advantageously results in the improvement of the operation speed as well as the reduction in physical operators, and in turn a decrease in the hardware cost. Furthermore, the elimination of one recursion operation and the use of maximum value operation saves memory space requirement for computing the SATD.

Figure 2A:
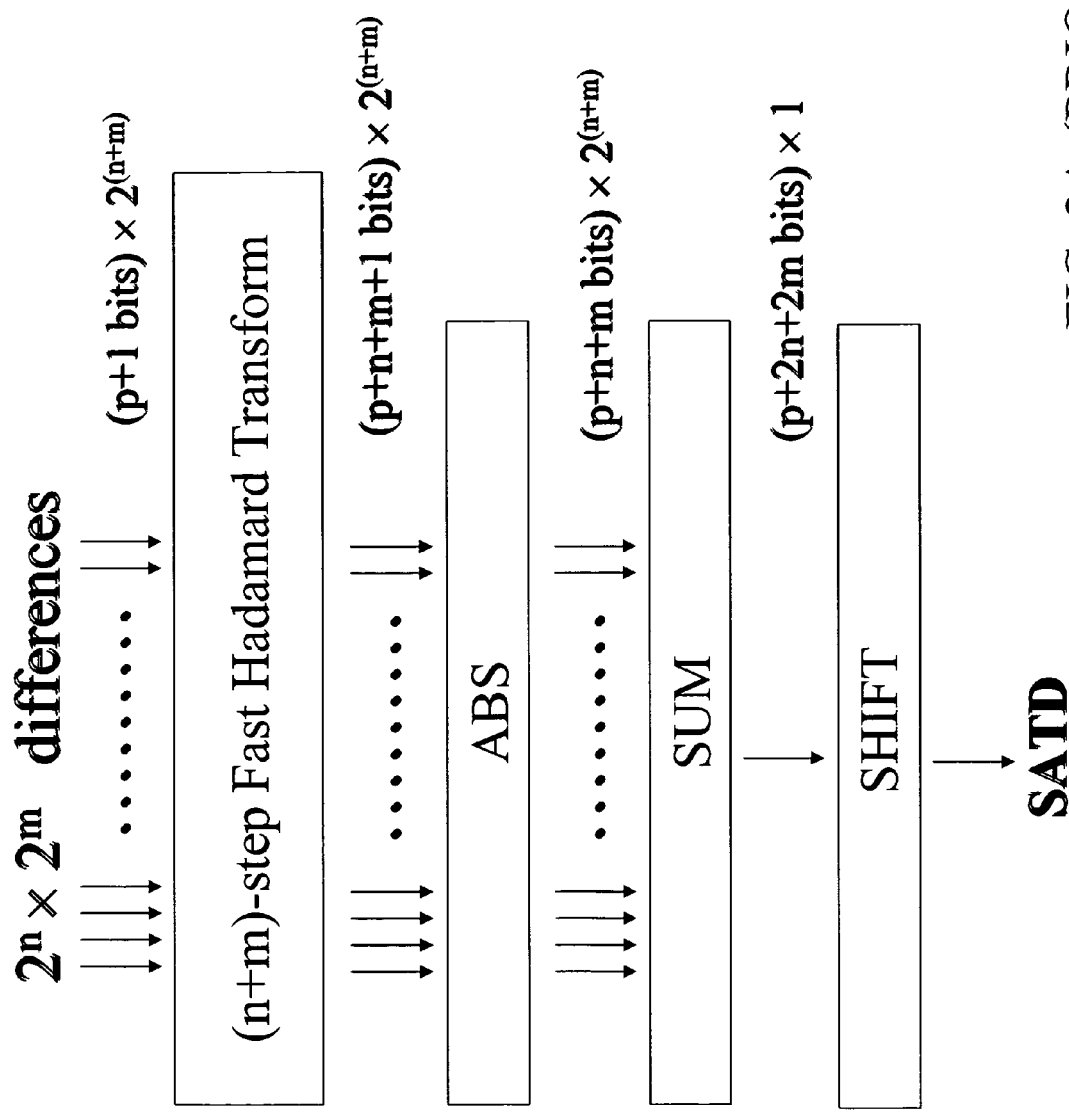
FIGS. 2A and 2B illustrate the number of bits required for the SATD (Sum of Absolute Transformed Differences) in a conventional method.
Figure 2B:
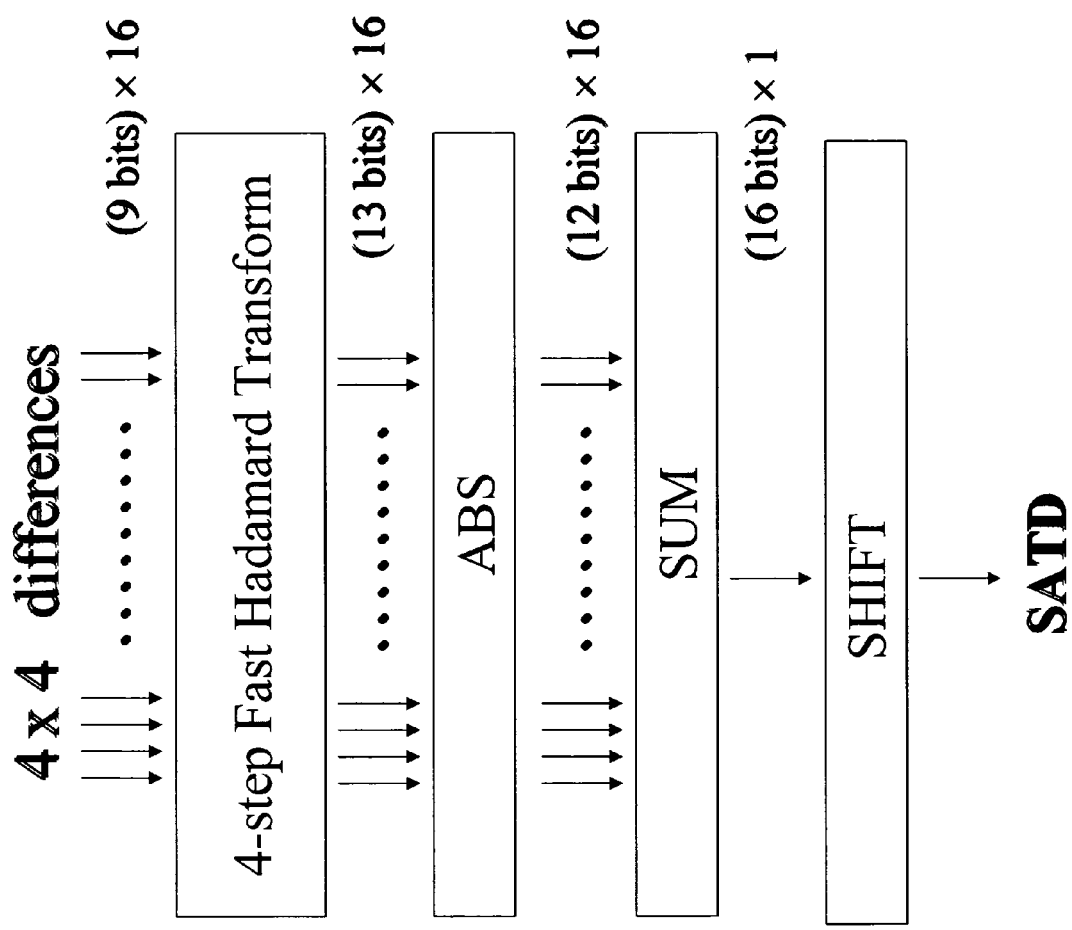

FIGS. 2A and 2B illustrate the number of bits required for the SATD in a conventional method. Referring to FIG. 2A, given $SATD_{N\times M}$ and a pixel size of p bits, for the residual differences of $2^n \times 2^m$, a total number of $(p+1) \times 2^{(n+m)}$ bits are required. A Hadamard transform including (n+m) times of recursion operations is performed, resulting in a total memory space requirement of $(p+1+n+m) \times 2^{(n+m)}$ bits. Next, absolute value operations are performed, which require $(p+n+m) \times 2^{(n+m)}$ bits due to the elimination of sign bits. After addition operations, the size of the SATD is (p+2n+2m)-bit. FIG. 2B illustrates an example given $SATD_{4\times4}$ and a pixel size of 8 bits (i.e., $d_{i,j}$ having a size of 9 bits and having a value ranging from −255 to 255), resulting in a 16-bit SATD.

Figure 3A:
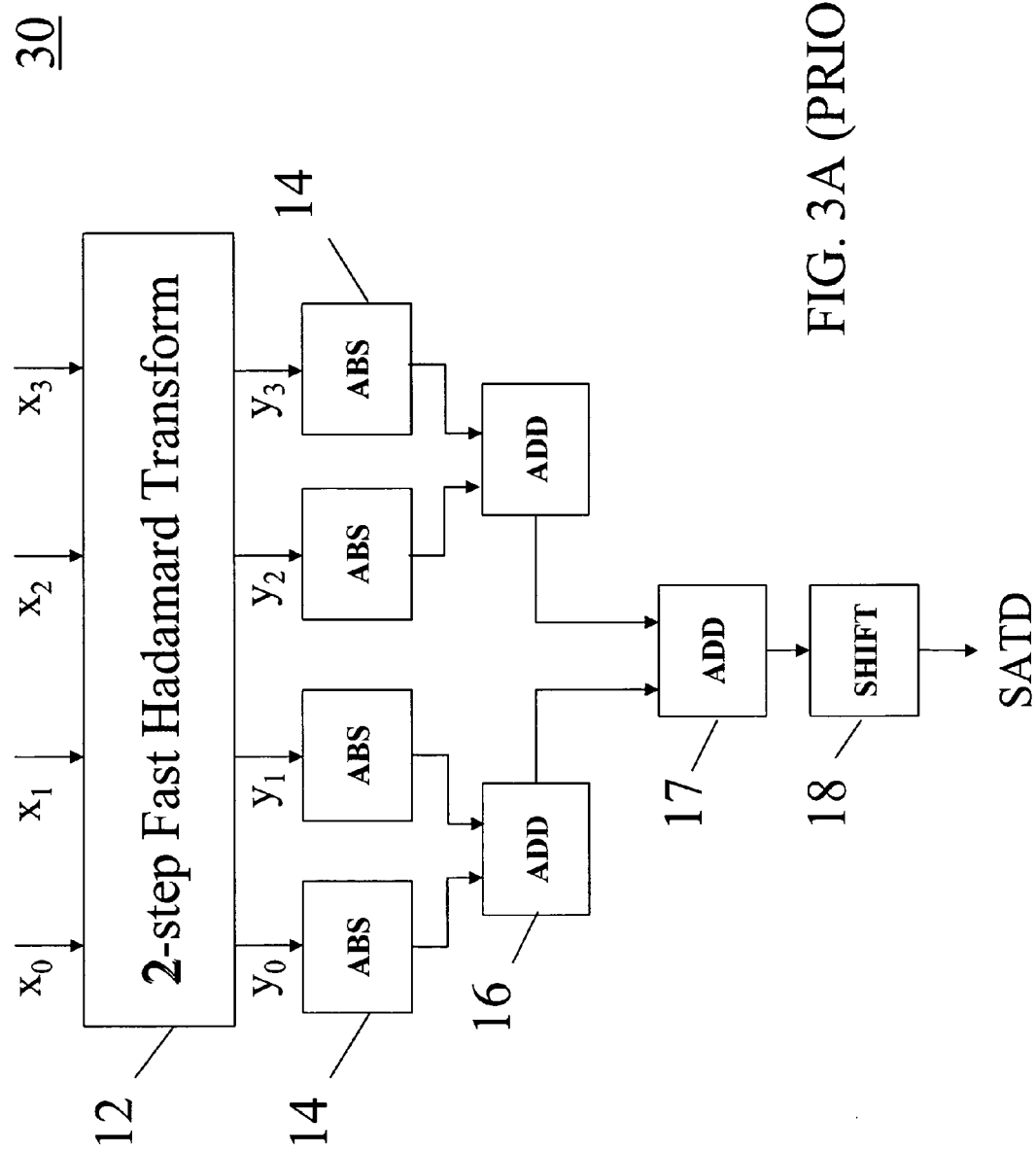
FIG. 3A is a schematic structure for implementing the conventional method illustrated in FIG. 2B.

FIG. 3A is a schematic structure 30 for implementing the conventional method illustrated in FIG. 2B. Referring to FIG. 3A, the structure 30 includes a 2-step FHT device 12, absolute-value devices 14, summing devices 16 and 17 including adders or subtractors, and a shifter 18. The FHT device 12 performs an entire FHT including two butterfly steps for input difference values $x_0$, $x_1$, $x_2$ and $x_3$ of a difference matrix to obtain a plurality of outputs $y_0$, $y_1$, $y_2$ and $y_3$ in a sequence. The absolute value of each of the outputs $y_0$, $y_1$, $y_2$ and $y_3$ is calculated in the absolute-value devices 14. These absolute values are added in summing devices 16 and 17 to obtain a binary resultant value. The resultant value in its binary form is then shifted right by one bit in the shifter 18 to obtain an SATD.

Figure 3B:
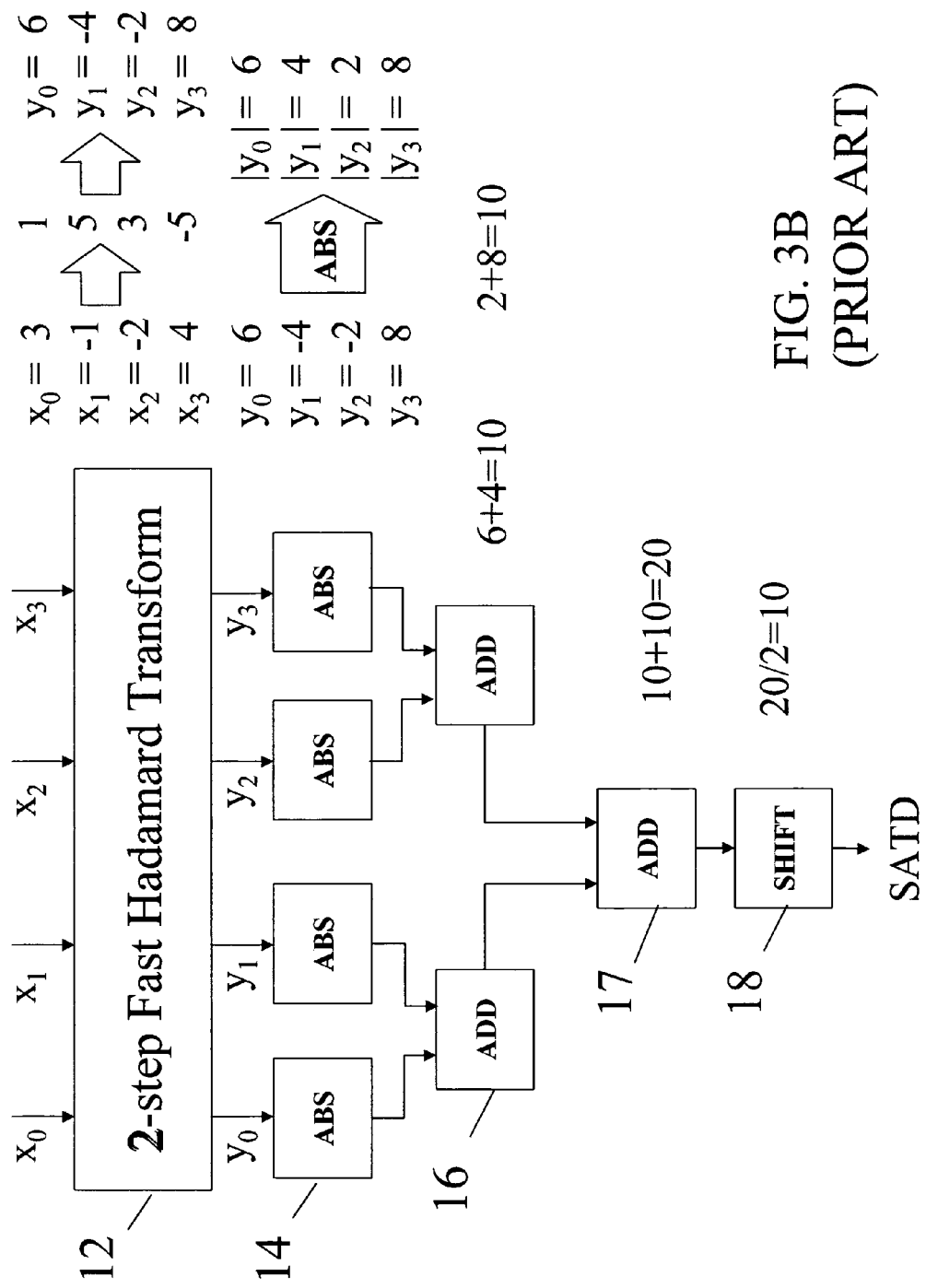
FIG. 3B is a schematic diagram illustrating the calculation of an SATD in the structure illustrated in FIG. 3A.

FIG. 3B is a schematic diagram illustrating the calculation of an SATD in the structure 30 illustrated in FIG. 3A. Referring to FIG. 3B, it is presumed that the FHT device 12 employs the butterfly structure illustrated in FIG. 1B and the input difference values $x_0$, $x_1$, $x_2$ and $x_3$ are 3, −1, −2 and 4, respectively. After the first butterfly step, also referring to FIG. 1B, the outputs are 1, 5, 3 and −5. After the second butterfly step, the outputs $y_0$, $y_1$, $y_2$ and $y_3$ are 6, −4, −2 and 8, respectively. The absolute-values devices 14 calculate the absolute values of the outputs $y_0$, $y_1$, $y_2$ and $y_3$, which are 6, 4, 2 and 8, respectively. The absolute values of the outputs $y_0$ and $y_1$, and $y_2$ and $y_3$ are added in the first-stage summing devices 16. First resultant values, i.e., 10 and 10, are then added in the second-stage summing device 17 to obtain a second resultant value, 20. The second resultant value in binary form is shifted right by one bit at the shifter 18 to obtain the SATD, 10.

Figure 4A:
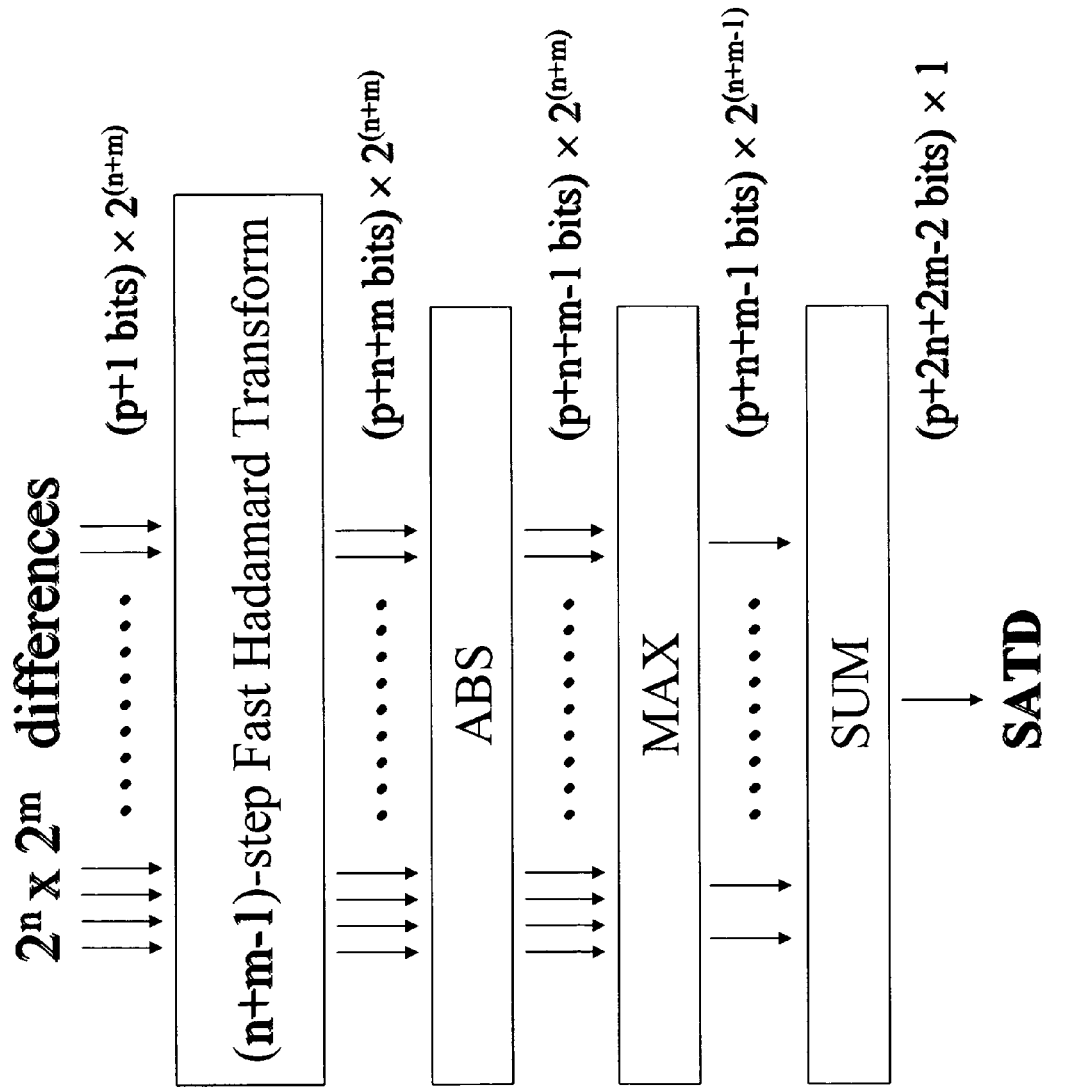
FIGS. 4A and 4B illustrate the number of bits required for the SATD in a method in accordance with one embodiment of the present invention.
Figure 4B:
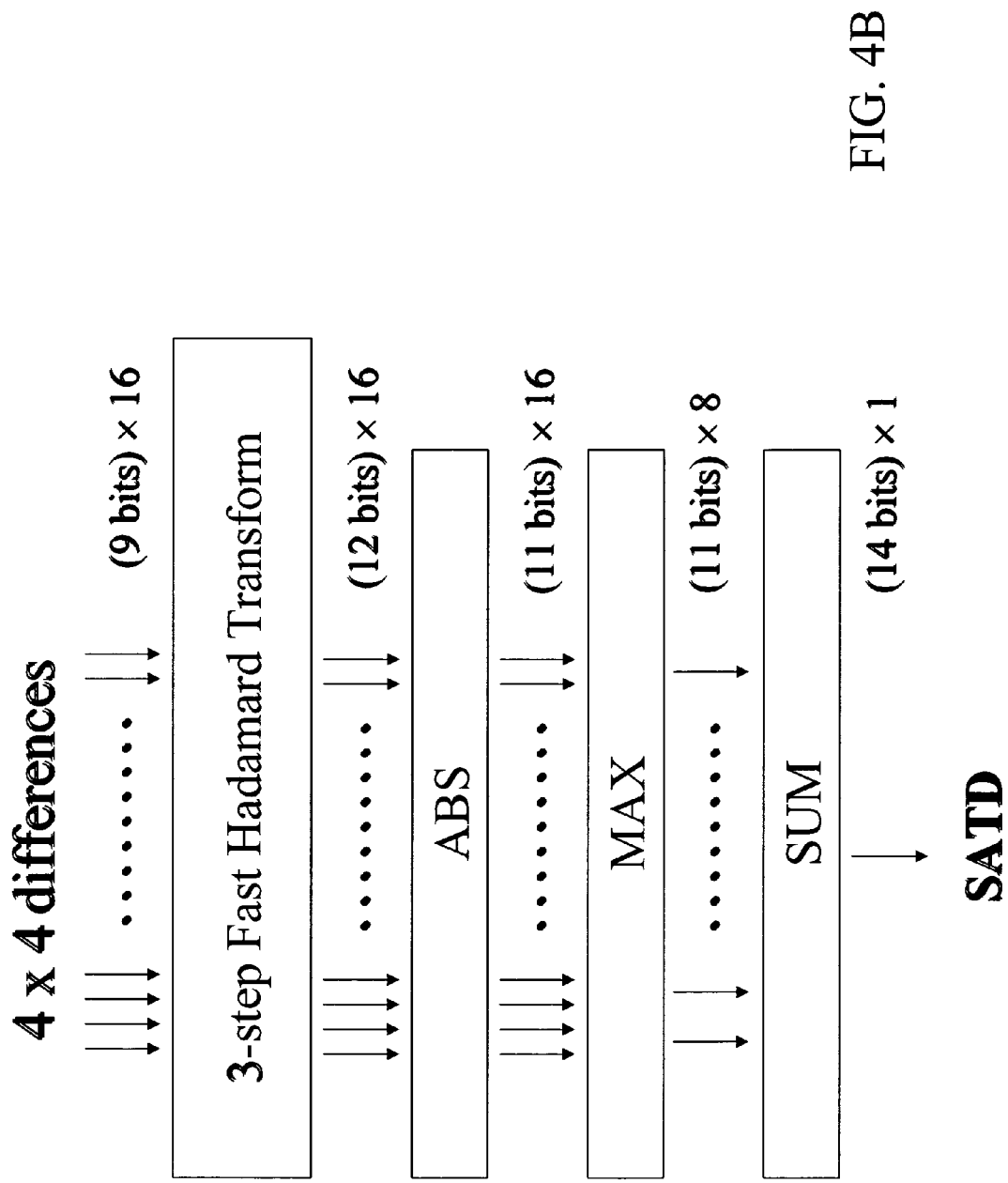

FIGS. 4A and 4B illustrate the number of bits required for the SATD in a method in accordance with one embodiment of the present invention. Referring to FIG. 4A, given $SATD_{N \times M}$ and a pixel size of p, for the residual differences of $2^n \times 2^m$, a total number of $(p+1) \times 2^{(n+m)}$ bits are required. In accordance with a method of the present invention, a part of an FHT including (n+m−1) butterfly steps, either including recursion or not, is performed, resulting in a total memory space requirement of $(p+n+m) \times 2^{(n+m)}$ bits. Next, absolute value operations are performed, which require $(p+n+m-1) \times 2^{(n+m)}$ bits due to the elimination of sign bits. Next, maximum value operations are performed, which require $(p+n+m-1) \times 2^{(n+m-1)}$ bits. After addition operations, the size of the SATD is (p+2n+2m−2)-bit, which is 2-bit smaller in size than that of the SATD of the conventional method shown in FIG. 2A. FIG. 4B illustrates an example given $SATD_{4 \times 4}$ and a pixel size of 8 bits, resulting in a 14-bit SATD.

Figure 5A:
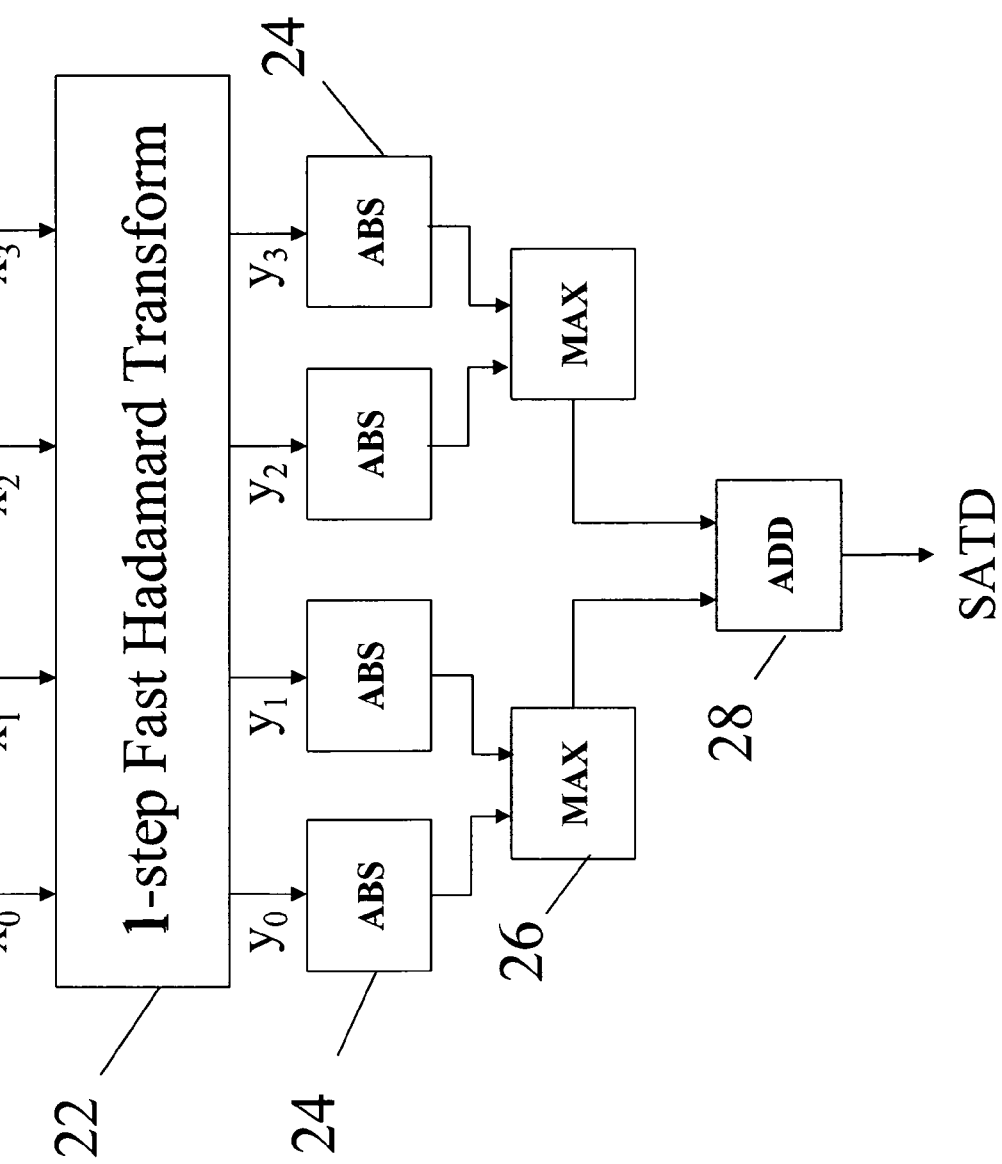
FIG. 5A is a schematic structure for implementing the method illustrated in FIG. 4B.

FIG. 5A is a schematic structure 50 for implementing the method illustrated in FIG. 4B. Referring to FIG. 5A, the structure 50 includes a 1-step FHT device 22, absolute-value devices 24, comparators 26 for performing maximum or minimum operations, and a summing device 28. The FHT device 22 performs a part of an FHT including one butterfly step for input difference values $x_0, x_1, x_2$ and $x_3$ of a difference matrix to obtain a plurality of outputs $y_0, y_1, y_2$ and $y_3$ in a sequence. The absolute value of each of the outputs $y_0, y_1, y_2$ and $y_3$ is calculated in the absolute-value devices 24. The absolute values of every two of the outputs $y_0, y_1, y_2$ and $y_3$ in the sequence are compared in comparators 26 to determine a greater value for each of the every two absolute values. The greater value of each of the every two absolute values are added in summing device 28 to obtain an SATD.

Figure 5B:
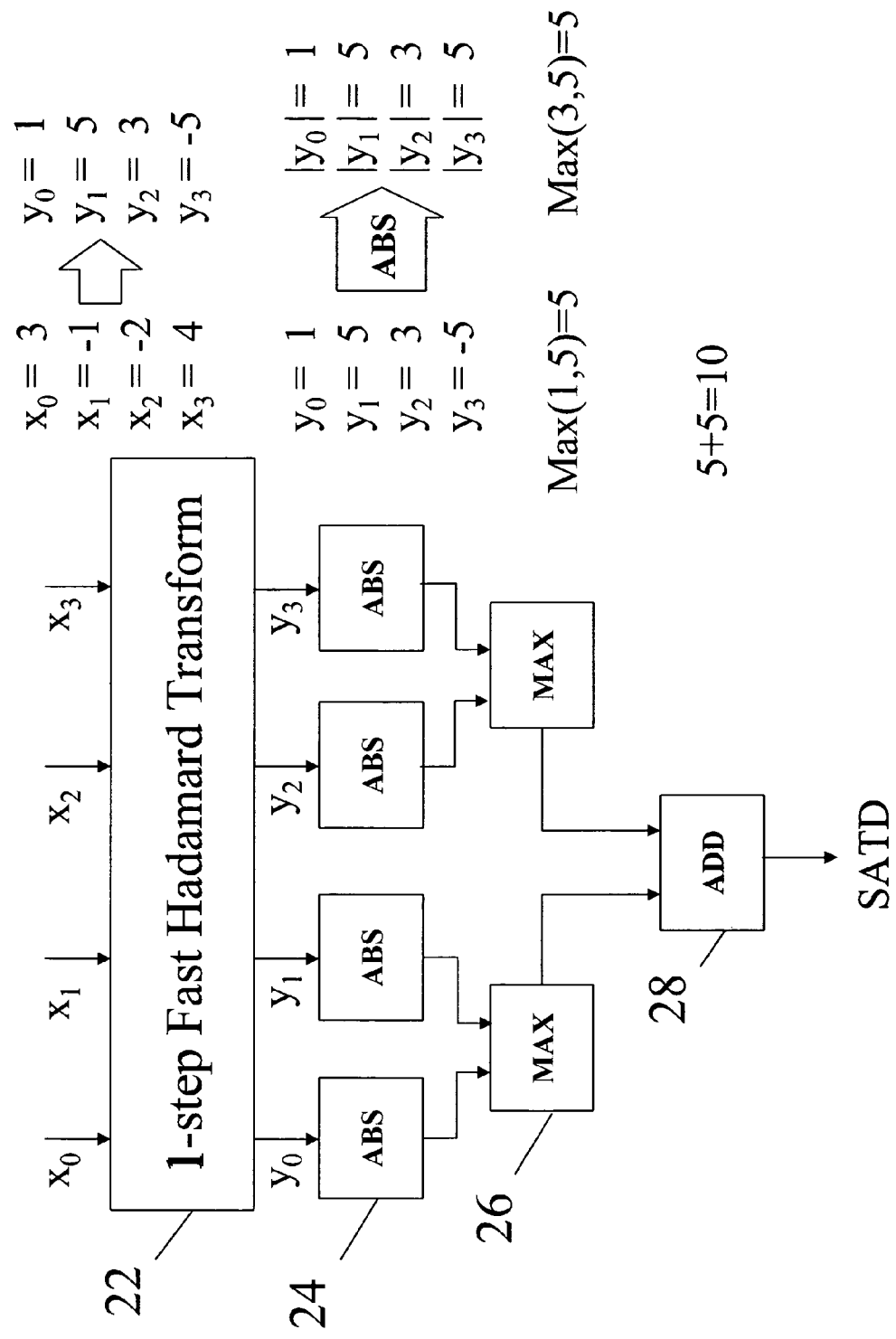
FIG. 5B is a schematic diagram illustrating the calculation of an SATD in the structure illustrated in FIG. 5A.

FIG. 5B is a schematic diagram illustrating the calculation of an SATD in the structure 50 illustrated in FIG. 5A. Referring to FIG. 5B, it is presumed that the FHT device 22 employs the butterfly structure illustrated in FIG. 1B and the input difference values $x_0, x_1, x_2$ and $x_3$ are 3, −1, −2 and 4, respectively. After the butterfly step, also referring to FIG. 1B, the outputs $y_0, y_1, y_2$ and $y_3$ are 1, 5, 3 and −5, respectively. As compared to the conventional method illustrated in FIG. 3A, one butterfly step in an FHT device is eliminated. The absolute-values devices 24 calculate the absolute values of the outputs $y_0, y_1, y_2$ and $y_3$, which are 1, 5, 3 and 5, respectively. The absolute values of the outputs $y_0$ and $y_1$, the first every two values in the sequence, are compared in one of the comparators 26 to determine a greater value, i.e., 5. Likewise, the absolute values of the outputs $y_2$ and $y_3$, the second every two values in the sequence, are compared in the other of the comparators 26 to determine a greater value, i.e., 5. The greater values, 5 and 5, are added in the summing device 28 to obtain the SATD, 10, which is the same as the SATD obtained by the conventional method illustrated in FIG. 3B. As a result, as compared to the conventional method, the present invention reduces the computation complexity and increase the operation speed in calculating the SATD without distorting the SATD.

Figure 6:
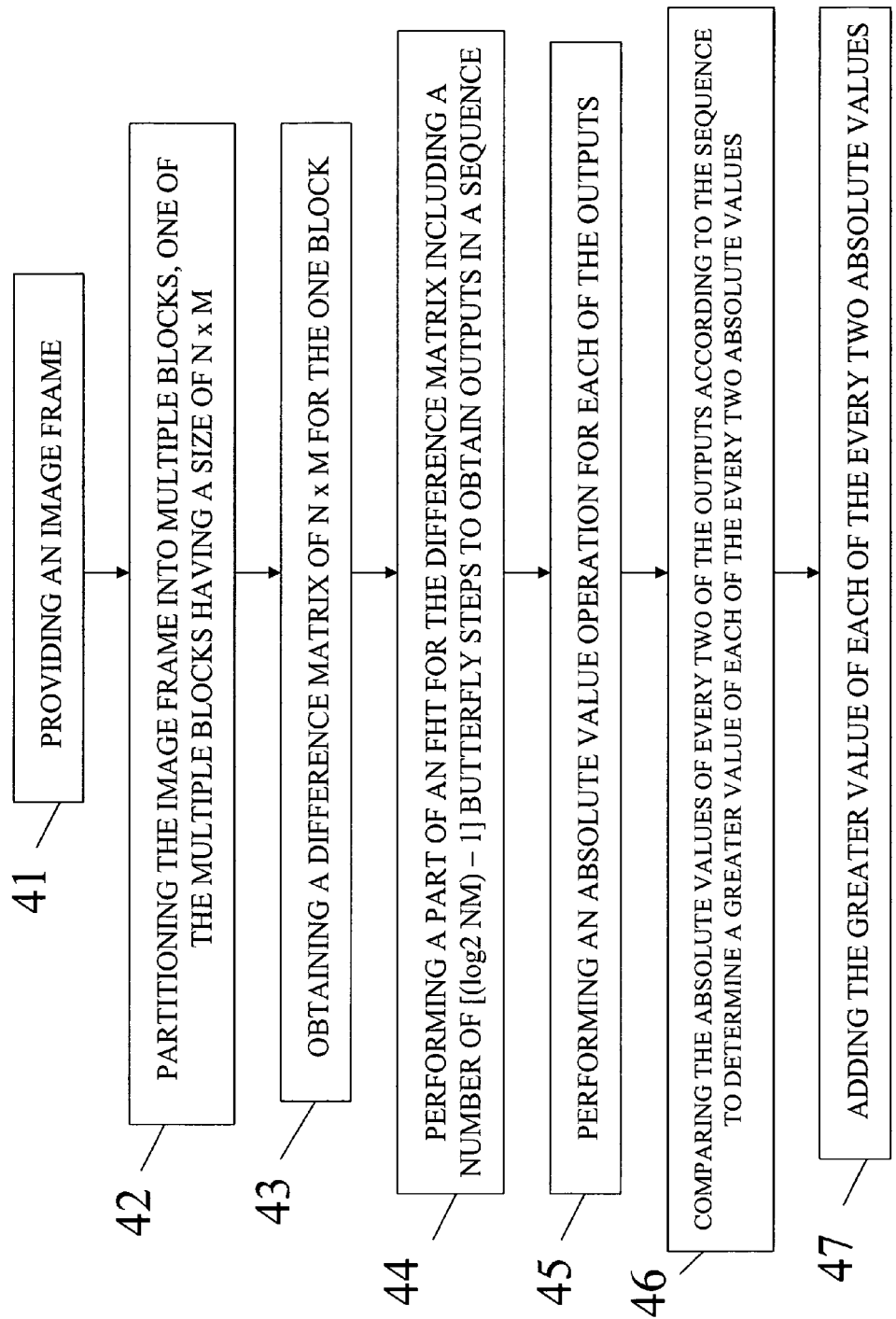
FIG. 6 is a flow diagram illustrating a method for determining an SATD in accordance with one embodiment of the present invention.

FIG. 6 is a flow diagram illustrating a method for determining an SATD in accordance with one embodiment of the present invention. Referring to FIG. 6, at step 41, an image frame is provided. The image frame is partitioned into multiple blocks at step 42, of which one block has a size of N×M in accordance with a partition mode, N and M being positive integers. At step 43, a difference matrix of N×M is obtained for the one block. In one aspect, the difference matrix is obtained in accordance with an inter prediction mode, where a block of the image frame is compared with a block predicted from a reference frame different from the image frame. In another aspect, the difference matrix is obtained in accordance with an intra prediction mode, where a block of the image frame is compared with another block predicted in the same image frame. At step 44, a part of an FHT for the difference matrix including a number of [(log₂ NM)−1] butterfly steps is performed to obtain outputs in a sequence. An absolute value operation for each of the outputs is then performed at step 45. Next, at step 46, the absolute values of every two of the outputs in the sequence is compared to determine a greater value of each of the two absolute values. The greater value of each of the every two absolute values are added to determined the SATD at step 47.

From the viewpoint of hardware, the operation costs for the operators add, max and abs are substantially the same. However, from the viewpoint of software, the operation costs for the operators abs and max are higher that that for the operator add. For example, if Intel's MMX instructions sets are used for background analysis, a weight of approximately 3 must be assigned to the operator abs because it takes one operation instruction to complete a maximum operation or an addition operation, while it takes three operation instructions to complete an absolute value operation including, for example, a first instruction to copy a value, a second instruction to calculate the complement of the value and a third instruction to compare the value and its complement to determine a greater value of the two. In consideration of the software cost, in a method in accordance with another embodiment of the present invention, the absolute value operations are replaced by maximum operations and addition operations given below.

$$\max(|a|, |b|) = \max(a + b, 0) - \min(a, b) \qquad \text{Equation (11)}$$

$$SATD_{N \times M}(D_{N \times M}) = \frac{4}{\sqrt{NM}}$$

$$\sum_{l=0}^{\frac{NM}{2}-1} \left( \max\left( t_l^{n+m-1} + t_{l+\frac{NM}{2}}^{n+m-1}, 0 \right) - \min\left( t_l^{n+m-1}, t_{l+\frac{NM}{2}}^{n+m-1} \right) \right) \qquad \text{Equation (12)}$$

Based on the Equation (11), the Equation (10) can be rewritten as the Equation (12). Table 2 lists the number of operations required for each of the operators in the Equations (8) and (12), given $SATD_{4 \times 4}$ and a weight of 3 assigned to each absolute value operation, which shows that the method according to one embodiment of the present invention is advantageous in operation speed.

TABLE 2

| operator/equation | add | max/min | abs (×3) | total |
|---|---|---|---|---|
| Equation (8) | 79 (=NM (n + m) + (NM − 1)) | 0 | 48 (=NM × 3) | 127 |
| Equation (12) | 71 (=NM (n + m − 1) + 3NM/2 − 1) | 16 (=NM) | 0 | 87 (=NM (n + m + 3/2) − 1) |

In addition to the Equation (11), other equations may be used to replace the absolute operations in the Equation (10), which are given below.

$$\max(|a|,|b|) = \max(a,b) - \min(a+b,0) \qquad \text{Equation (13)}$$

$$\max(|a|,|b|) = -\min(-a-b,0) - \min(a,b) \qquad \text{Equation (14)}$$

$$\max(|a|,|b|) = \max(a,b) + \max(-a-b,0) \qquad \text{Equation (15)}$$

Figure 7:
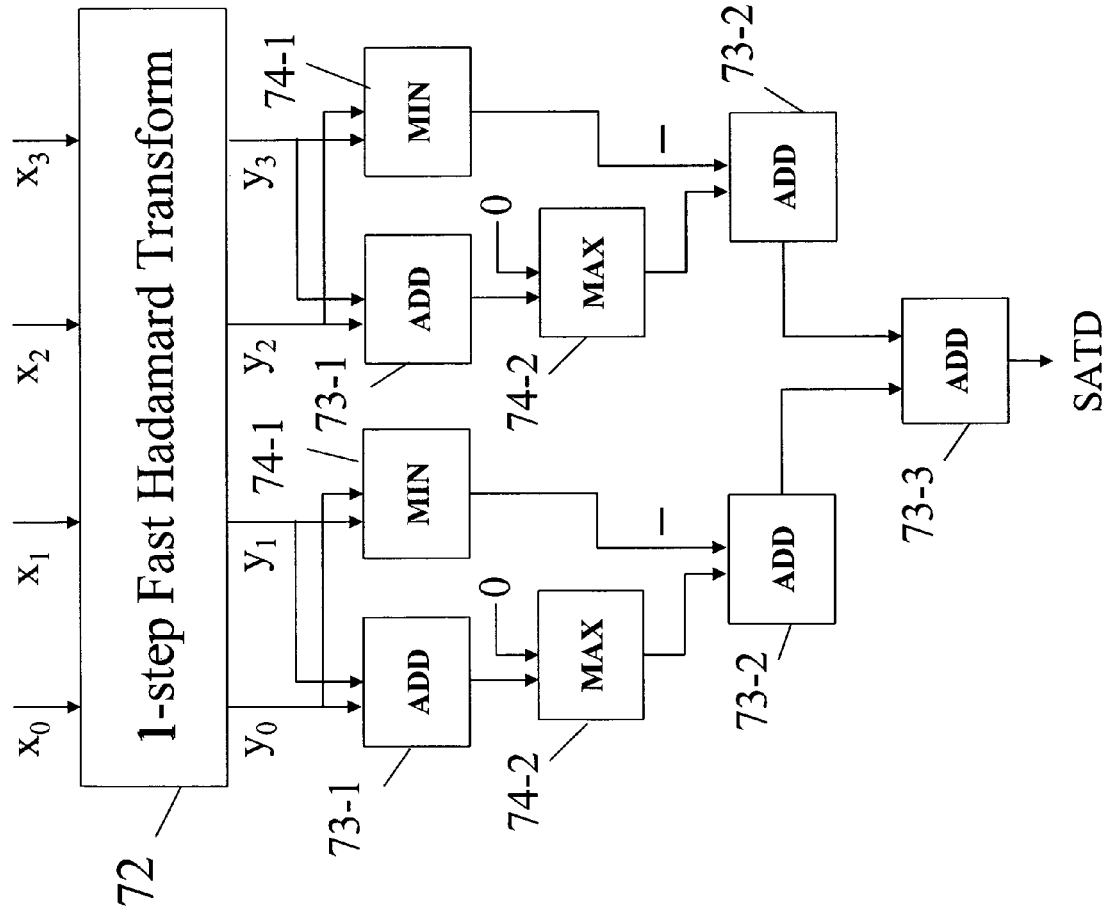
FIG. 7 is a schematic structure for determining an SATD in accordance with one embodiment of the present invention.

FIG. 7 is a schematic structures 70 for determining an SATD in accordance with one embodiment of the present invention based on the Equation (11). Referring to FIG. 7, the structure 70 includes a 1-step FHT device 72, first summing devices 73-1 and first comparators 74-1, second comparators 74-2, second summing devices 73-2 and a third summing device 73-3. The FHT device 72 performs a part of an FHT including one butterfly step for input difference values $x_0, x_1, x_2$ and $x_3$ of a difference matrix to obtain a plurality of outputs $y_0, y_1, y_2$ and $y_3$ in a sequence. The first summing devices 73-1 and first comparators 74-1 are used to replace the absolute-value devices 24 of the structure 50 illustrated in FIG. 5A. Specifically, the values of every two of the outputs $y_0, y_1, y_2$ and $y_3$ in the sequence are added in first summing devices 73-1 to obtain a first resultant value, and compared in the first comparators 74-1 to determine a smaller value for each of the every two values. The first resultant value is compared to zero in the second comparators 74-2 to determine a greater value. The smaller value is subtracted from the greater value at the second summing deices 73-2 to determine a second resultant value. The second resultant value for each of the every two output values are added in the third summing device 73-3 to obtain an SATD. The SATD equals 10 if the same input difference values of $x_0, x_1, x_2$ and $x_3$ of a difference matrix in FIG. 5B are used.

As compared to the structure 50 illustrated in FIG. 5A, the structure 70 has a higher hardware cost but enjoys a much lower software cost as reflected in the above Table 2. Skilled persons in the art will realize that the structure 50 may be advantageously implemented in hardware and the structure 70 may be advantageously implemented in software, even though both of hardware and software implementation are available.

Figure 8:
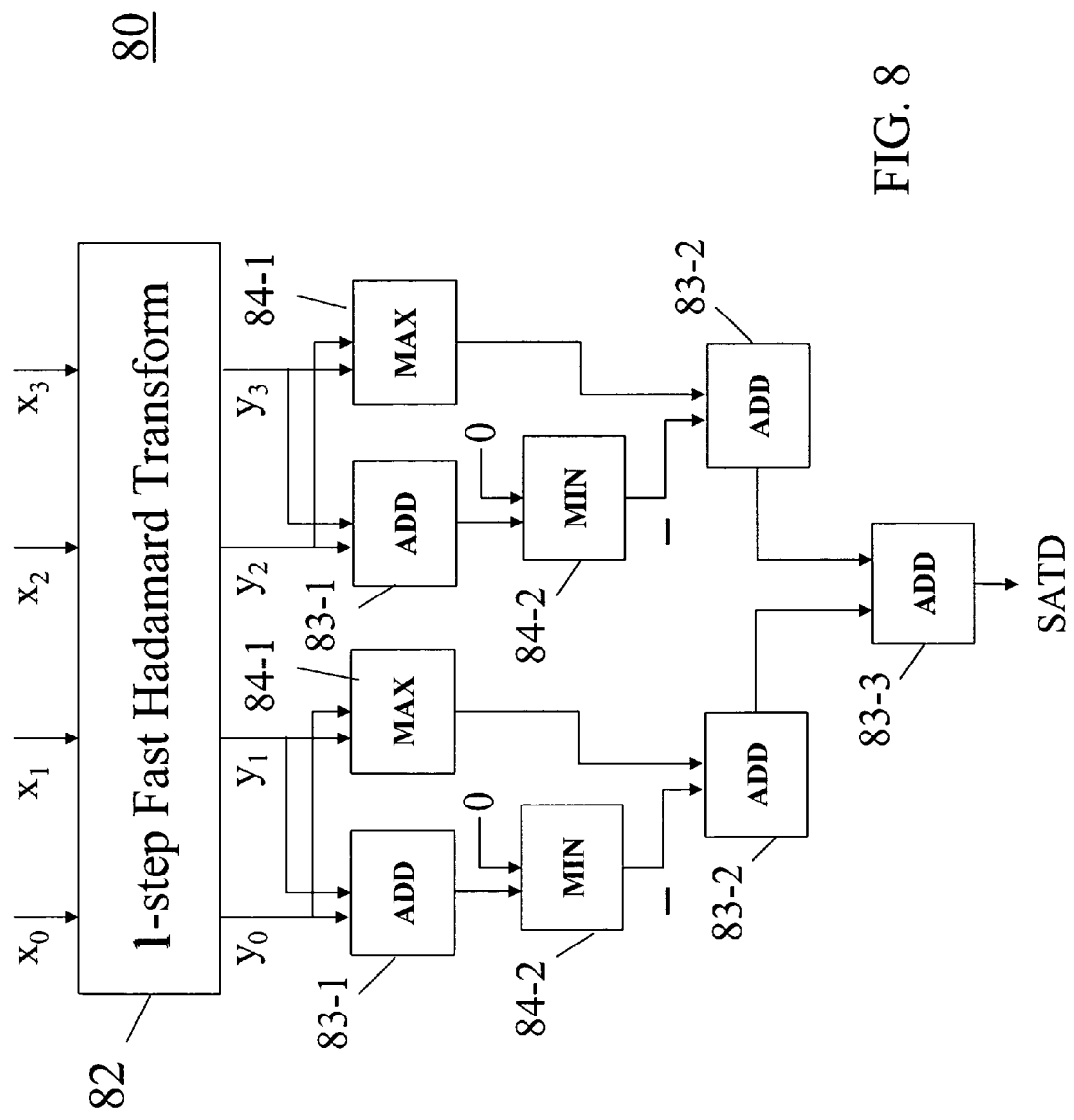
FIG. 8 is a schematic structure for determining an SATD in accordance with another embodiment of the present invention.

FIG. 8 is a schematic structure 80 for determining an SATD in accordance with another embodiment of the present invention based on the Equation (13). Referring to FIG. 8, the structure 80 includes a 1-step FHT device 82, first summing devices 83-1 and first comparators 84-1, second comparators 84-2, second summing devices 83-2 and a third summing device 83-3. The FHT device 82 performs a part of an FHT including one butterfly step for input difference values $x_0, x_1, x_2$ and $x_3$ of a difference matrix to obtain a plurality of outputs $y_0, y_1, y_2$ and $y_3$ in a sequence. The first summing devices 83-1 and first comparators 84-1 are used to replace the absolute-value devices 24 of the structure 50 illustrated in FIG. 5A. Specifically, the values of every two of the outputs $y_0, y_1, y_2$ and $y_3$ in the sequence are added in first summing devices 83-1 to obtain a first resultant value, and compared in the first comparators 84-1 to determine a greater value for each of the every two values. The first resultant value is compared to zero in the second comparators 84-2 to determine a smaller value. The smaller value is subtracted from the greater value at the second summing deices 83-2 to determine a second resultant value. The second resultant value for each of the every two output values are added in the third summing device 83-3 to obtain an SATD. The SATD equals 10 if the same input difference values of $x_0, x_1, x_2$ and $x_3$ of a difference matrix in FIG. 5B are used. Skilled persons in the art will realize that the structure 80 may be advantageously implemented in software.

Figure 9:
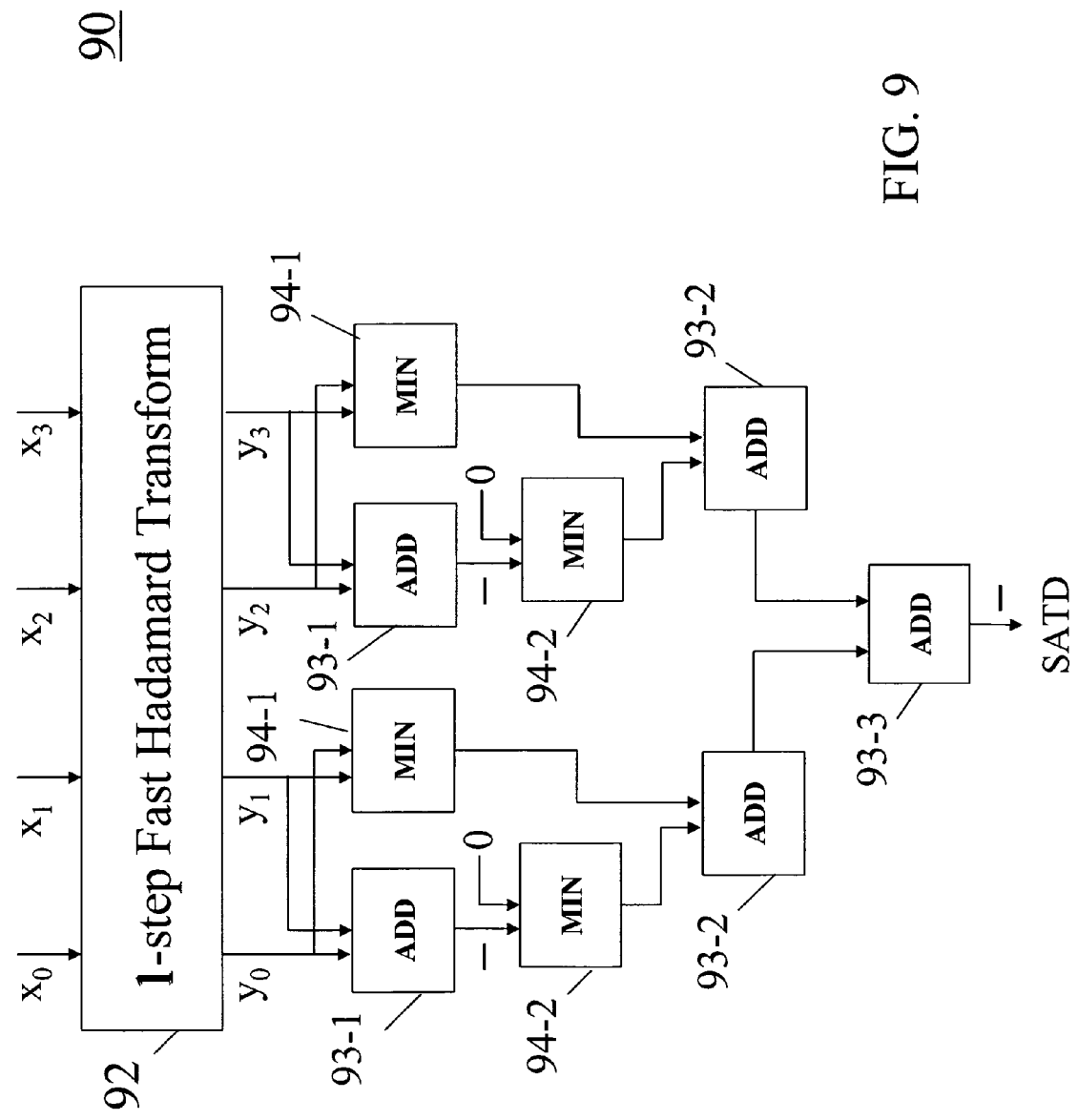
FIG. 9 is a schematic structure for determining an SATD in accordance with still another embodiment of the present invention.

FIG. 9 is a schematic structure 90 for determining an SATD in accordance with still another embodiment of the present invention based on the Equation (14). Referring to FIG. 9, the structure 90 includes a 1-step FHT device 92, first summing devices 93-1 and first comparators 94-1, second comparators 94-2, second summing devices 93-2 and a third summing device 93-3. The FHT device 92 performs a part of an FHT including one butterfly step for input difference values $x_0, x_1, x_2$ and $x_3$ of a difference matrix to obtain a plurality of outputs $y_0, y_1, y_2$ and $y_3$ in a sequence. The first summing devices 93-1 and first comparators 94-1 are used to replace the absolute-value devices 24 of the structure 50 illustrated in FIG. 5A. Specifically, the values of every two of the outputs $y_0, y_1, y_2$ and $y_3$ in the sequence are added in first summing devices 93-1 to obtain a first resultant value, and compared in the first comparators 94-1 to determine a first smaller value for each of the every two values. The first resultant value in its negative form is compared to zero in the second comparators 84-2 to determine a second smaller value. The first smaller value and the second smaller value are added at the second summing deices 93-2 to determine a second resultant value. The second resultant value for each of the every two output values are added in the third summing device 93-3 to obtain an SATD in its negative form. The SATD equals 10 if the same input difference values of $x_0, x_1, x_2$ and $x_3$ of a difference matrix in FIG. 5B are used. Skilled persons in the art will realize that the structure 90 may be advantageously implemented in software.

Figure 10:
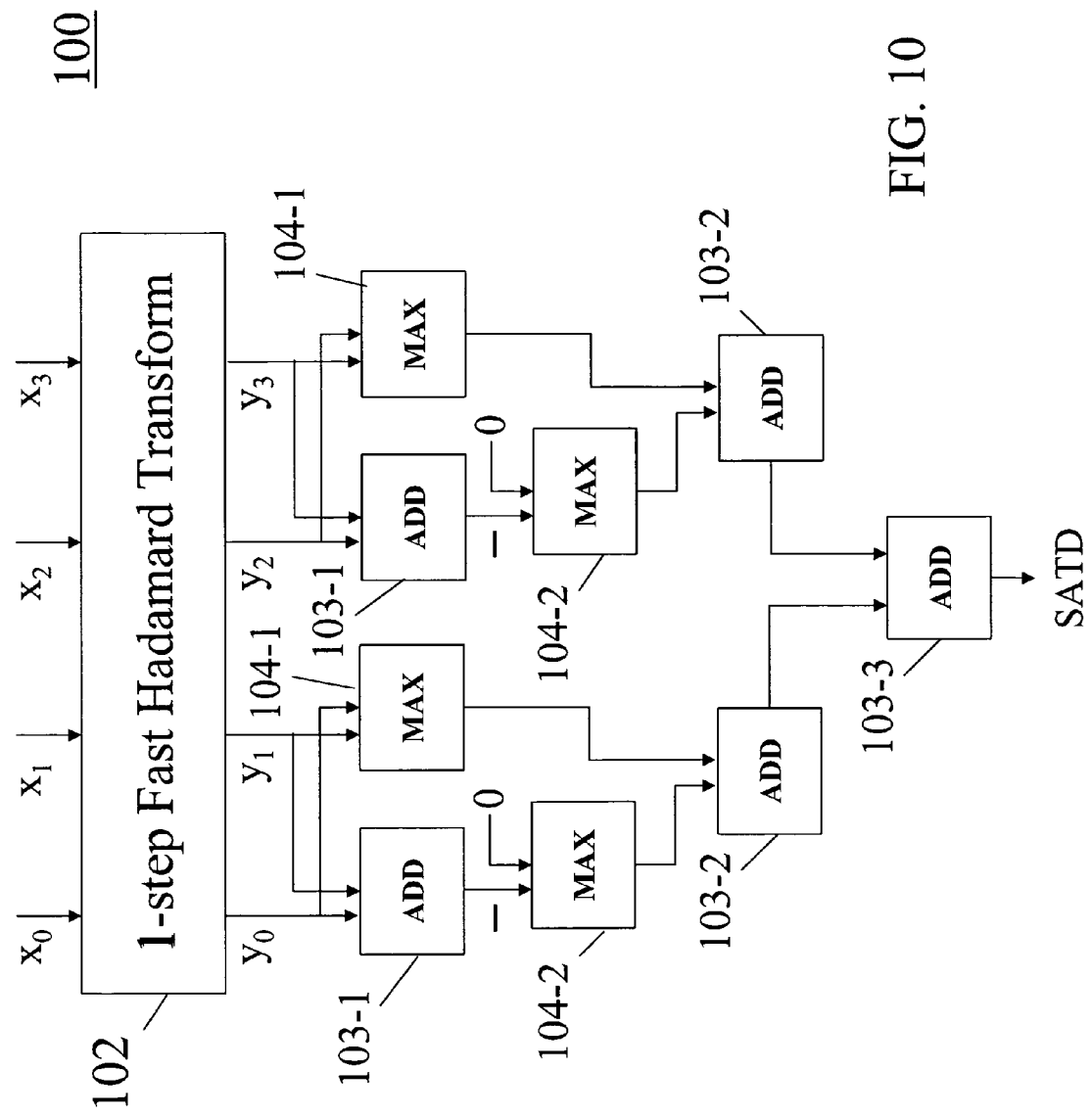
FIG. 10 is a schematic structure for determining an SATD in accordance with yet another embodiment of the present invention.

FIG. 10 is a schematic structure for determining an SATD in accordance with yet another embodiment of the present invention based on the Equation (15). Referring to FIG. 10, the structure 100 includes a 1-step FHT device 102, first summing devices 103-1 and first comparators 104-1, second comparators 104-2, second summing devices 103-2 and a third summing device 103-3. The FHT device 102 performs a part of an FHT including one butterfly step for input difference values $x_0, x_1, x_2$ and $x_3$ of a difference matrix to obtain a plurality of outputs $y_0, y_1, y_2$ and $y_3$ in a sequence. The first summing devices 103-1 and first comparators 104-1 are used to replace the absolute-value devices 24 of the structure 50 illustrated in FIG. 5A. Specifically, the values of every two of the outputs $y_0, y_1, y_2$ and $y_3$ in the sequence are added in first summing devices 103-1 to obtain a first resultant value, and compared in the first comparators 104-1 to determine a first greater value for each of the every two values. The first resultant value in its negative form is compared to zero in the second comparators 104-2 to determine a second greater value. The first greater value and the second smaller value are added at the second summing deices 103-2 to determine a second resultant value. The second resultant value for each of the every two output values are added in the third summing device 103-3 to obtain an SATD. The SATD equals 10 if the same input difference values of $x_0, x_1, x_2$ and $x_3$ of a difference matrix in FIG. 5B are used. Skilled persons in the art will realize that the structure 100 may be advantageously implemented in software.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the preferred embodiments described above without departing from the broad inventive concept thereof. It is understood, therefore, that this invention is not limited to the particular embodiments disclosed, but is intended to cover modifications within the spirit and scope of the present application as defined by the appended claims.

I claim:

1. A method for determining an encoding cost for a block of video data, comprising:
   providing an image frame;
   partitioning the image frame into multiple blocks;
   obtaining a difference matrix for one of the multiple blocks;
   performing a part of an FHT (Fast Hadamard Transform) for the difference matrix including at least one butterfly step to obtain outputs in a sequence, the at least one butterfly step in number being one butterfly step less than that required for performing an entire FHT;
   performing an absolute value operation for each of the outputs;
   comparing the absolute values of every two of the outputs according to the sequence to determine a greater value for each of the every two absolute values; and
   adding the greater value of each of the every two absolute values thereby obtaining the encoding cost as a sum of absolute transformed differences (SATD) of the difference matrix.

2. The method of claim 1, further comprising performing an inter prediction between the one block in the image frame and another block predicted from a reference frame in obtaining the difference matrix.

3. The method of claim 1, further comprising performing an intra prediction between the one block in the image frame and another block predicted from the same image frame in obtaining the difference matrix.

4. The method of claim 1, further comprising performing a part of an FHT including at least one butterfly step further including recursion operations.

5. The method of claim 1, wherein the one block having a size of N×M, N and M being integers, further comprising:
   obtaining a difference matrix of N×M for the one block; and
   performing a part of an FHT for the difference matrix including a number of $[(\log_2 NM)-1]$ butterfly steps.

6. The method of claim 5, further comprising:
   assigning a memory space of $[(p+1) \times NM]$ bits for the difference matrix, p being a pixel size of the image frame; and
   assigning a memory space of $[(p+\log_2 NM) \times NM]$ bits for the outputs.

7. The method of claim 5, further comprising assigning a memory space of $[(p+\log_2 NM-1) \times NM]$ bits for the absolute values of the outputs.

8. The method of claim 5, further comprising assigning a memory space of $[(p+\log_2 NM-1) \times NM/2]$ bits for the greater value of each of the every two absolute values.

9. The method of claim 5, further comprising assigning a memory space of $[p+2 (\log_2 NM-1)]$ bits for the SATD.

10. A method for determining an encoding cost for a block of video data, comprising:
    providing an image frame;
    partitioning the image frame into multiple blocks including one having a size of N×M, N and M being integers;
    obtaining a difference matrix of N×M for the one block;
    performing a part of an FHT (Fast Hadamard Transform) for the difference matrix including a number of $[(\log_2 NM)-1]$ butterfly steps to obtain outputs in a sequence;
    performing an absolute value operation for each of the outputs;
    comparing the absolute values of every two of the outputs according to the sequence to determine a greater value for each of the every two absolute values; and
    adding the greater value of each of the every two absolute values thereby obtaining the encoding cost as a sum of absolute transformed differences (SATD) of the difference matrix.

11. The method of claim 10, further comprising obtaining an SATD function in the form of:

$$SATD_{N \times M}(D_{N \times M}) = \frac{2}{\sqrt{NM}} \sum_{l=0}^{NM-1} |t_l^{n+m}|,$$

where $t_{i \cdot M+j}^0 = d_{i,j}$ is an initial value, $d_{i,j}$ being an entry of the difference matrix $D_{N \times M}$, and $$\begin{cases} t_{2l}^{k+1} = t_l^k + t_{l+\frac{NM}{2}}^k \\ t_{2l+1}^{k+1} = t_l^k - t_{l+\frac{NM}{2}}^k \end{cases}, \forall k \geq 0$$

is the recursion body.

12. The method of claim 11, further comprising rewriting the SATD function in the form of:

$$SATD_{N \times M}(D_{N \times M}) = \frac{4}{\sqrt{NM}} \sum_{l=0}^{\frac{NM}{2}-1} \max\left(|t_l^{n+m-1}|, \left|t_{l+\frac{NM}{2}}^{n+m-1}\right|\right),$$

where the operator max defines a comparison operation for obtaining a greater one of two values.

13. The method of claim 12, further comprising rewriting the SATD function in the form of:

$$SATD_{N \times M}(D_{N \times M}) =$$

$$\frac{4}{\sqrt{NM}} \sum_{l=0}^{\frac{NM}{2}-1} \left(\max\left(t_l^{n+m-1} + t_{l+\frac{NM}{2}}^{n+m-1}, 0\right) - \min\left(t_l^{n+m-1}, t_{l+\frac{NM}{2}}^{n+m-1}\right)\right).$$

14. The method of claim 10, further comprising assigning a memory space of $[p+2 (\log_2 NM-1)]$ bits for the SATD.

15. A method for determining an encoding cost for a block of video data, comprising:
    providing an image frame;
    partitioning the image frame into multiple blocks;
    obtaining a difference matrix for one of the multiple blocks;
    performing a part of an FHT (Fast Hadamard Transform) for the difference matrix including at least one butterfly step to obtain outputs in a sequence, the at least one butterfly step in number being one butterfly step less than that required for performing an entire FHT;
    performing a summing operation for every two of the outputs according to the sequence to obtain a sum;
    performing a first comparison operation for every two of the outputs according to the sequence; and performing a second comparison operation for the sum and zero thereby obtaining the encoding cost as a sum of absolute transformed differences (SATD) of the difference matrix.

16. The method of claim 15, further comprising:
adding every two of the outputs according to the sequence to obtain a first sum; and
comparing every two of the outputs according to the sequence to obtain a smaller value.

17. The method of claim 16, further comprising:
comparing the first sum with zero to obtain a greater value; and
subtracting the smaller value from the greater value.

18. The method of claim 15, further comprising:
adding every two of the outputs according to the sequence to obtain a first sum; and
comparing every two of the outputs according to the sequence to obtain a greater value.

19. The method of claim 18, further comprising:
comparing the first sum with zero to obtain a smaller value; and
subtracting the smaller value from the greater value.

20. The method of claim 15, further comprising:
adding every two of the outputs according to the sequence to obtain a first sum; and
comparing every two of the outputs according to the sequence to obtain a first smaller value.

21. The method of claim 20, further comprising:
comparing a complement of the first sum with zero to obtain a second smaller value; and
adding the first smaller value and the second smaller value.

22. The method of claim 15, further comprising:
adding every two of the outputs according to the sequence to obtain a first sum; and
comparing every two of the outputs according to the sequence to obtain a first greater value.

23. The method of claim 22, further comprising:
comparing a complement of the first sum with zero to obtain a second greater value; and
adding the first greater value and the second greater value.

24. A method for determining an encoding cost for a block of video data, comprising:
providing an image frame;
partitioning the image frame into multiple blocks;
obtaining a difference matrix for one of the multiple blocks;
performing a part of an FHT (Fast Hadamard Transform) for the difference matrix including at least one butterfly step to obtain outputs in a sequence, the at least one butterfly step in number being one butterfly step less than that required for performing an entire FHT; and
performing comparison operations for values corresponding to every two of the outputs according to the sequence thereby obtaining the encoding cost as a sum of absolute transformed differences (SATD) of the difference matrix.

25. A device for determining an SATD (Sum of Absolute Transformed Differences) for a difference matrix, comprising:
a fast Hadamard transformer for performing a part of an FHT (Fast Hadamard Transform) for the difference matrix including at least one butterfly step to obtain outputs in a sequence, the at least one butterfly step in number being one butterfly step less than that required for performing an entire FHT;
a processing unit for performing an absolute value operation for each of the outputs;
a comparator unit for comparing the absolute values of every two of the outputs according to the sequence to determine a greater value for each of the every two absolute values; and
a summing unit for adding the greater value of each of the every two absolute values.

* * * * *